(12) United States Patent
Kirschbaum

(10) Patent No.: US 8,181,606 B1
(45) Date of Patent: May 22, 2012

(54) CAT TOY

(76) Inventor: Phillip Graham Kirschbaum, Petaluma, CA (US)

(*) Notice: Subject to any disclaimer, the term of this patent is extended or adjusted under 35 U.S.C. 154(b) by 0 days.

(21) Appl. No.: 13/066,557

(22) Filed: Apr. 19, 2011

(51) Int. Cl.
*A01K 29/00* (2006.01)

(52) U.S. Cl. ........................................ 119/708; 119/707

(58) Field of Classification Search .................. 119/702, 119/707, 708, 709, 710, 711; D30/156, 160; 446/489
See application file for complete search history.

(56) References Cited

U.S. PATENT DOCUMENTS

| | | | | | |
|---|---|---|---|---|---|
| 4,499,855 | A | * | 2/1985 | Galkiewicz | 119/708 |
| 4,712,510 | A | * | 12/1987 | Tae-Ho | 119/708 |
| 4,930,448 | A | * | 6/1990 | Robinson | 119/708 |
| 4,940,018 | A | * | 7/1990 | Edling | 119/708 |
| D309,964 | S | * | 8/1990 | Viner et al. | D30/160 |
| D318,150 | S | * | 7/1991 | Eitel et al. | D30/160 |
| 5,467,740 | A | * | 11/1995 | Redwine | 119/707 |
| 5,743,215 | A | * | 4/1998 | Zeff | 119/708 |
| 5,782,207 | A | * | 7/1998 | Goodham | 119/707 |
| 6,314,913 | B1 | * | 11/2001 | Lettau et al. | 119/707 |
| D452,050 | S | * | 12/2001 | Ritchey | D30/160 |
| 7,121,230 | B2 | * | 10/2006 | Ritchey | 119/708 |
| 7,562,639 | B2 | * | 7/2009 | Ritchey | 119/708 |

* cited by examiner

*Primary Examiner* — T. Nguyen

(57) ABSTRACT

A cat toy with a rigid outer tube member, a rigid inner tube member, an elastic cord member, a pull knob and a toy element. The inner tube member slidably and telescopingly engaged within the outer tube member. The elastic cord member is slidably engaged within the inner tube member. The toy element and the stop plate are fixedly attached to the end of the elastic cord. The pull knob is attached to one end of the inner tube member and to one end of the elastic cord member so that when a user pulls back on the pull knob, the elastic cord member stretches, causing the toy element to be drawn to the end of the outer tube member. When the pull knob is released by the user, the inner tube and the elastic cord and the toy element shoot outward for engaging a cat in play.

3 Claims, 4 Drawing Sheets

CAT TOY

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of cat toys and more specifically to an elastic cord cat toy assembly.
Toys specifically designed to engage cats in playful activity are well known. Toys such as fake mice, feathers and balls have all been marketed and sold to cat lovers in order to give their cats items to play with in place of their natural hunting activity that occurs in the wild.
One such cat toy was invented by Tom Lettau et al in U.S. Pat. No. 6,314,913. This invention describes a cat toy at the end of a string which is attached to a modified fishing reel. The user can dangle the cat toy and then wind the string back up onto the reel to create movement of the play toy at the end of the string.
Although the fishing reel concept does provide a novel way to entertain a cat, it has several deficiencies. Firstly, to use that toy, the user must unwind the string or cast the string out, as is done when casting for a fish. Either activity is time consuming and may cause the cat to loose interest when a cast toy lands too far away from the cat. Furthermore, the toy at the end of the string can not be twisted and turned by the user because the string is too thin and limp to be able to transfer any twisting action imparted to the string by the user to the cat toy attached to the string. Finally, the non elastic nature of the string prevents the ability to produce an instant shooting out action of the toy.

BRIEF SUMMARY OF THE INVENTION

The primary object of the invention is to provide a cat toy that allows a play toy element to be shot out towards a cat and then easily retrieved providing a novel and high degree of play value for the cat and the cat owner.

Another object of the invention is to provide a cat toy that can be remotely twisted and turned by the user.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed cat toy comprising: a rigid outer tube member, a rigid inner tube member, an elastic cord member, a stop plate, a pull knob, a toy element, said rigid inner tube member slidably and telescopingly engaged within said rigid outer tube member, said elastic cord member slidably engaged within said rigid inner tube member, said toy element and said stop plate fixedly attached to the distal end of said elastic cord member, said pull knob fixedly attached to one end of said rigid inner tube member and also to one end of said elastic cord member, so that when a user pulls back on said pull knob, said elastic cord member stretches, causing said stop plate and said toy element to be drawn to intimate proximity to the distal end of said rigid outer tube member, so that when said pull knob is released by said user, said rigid inner tube member and said elastic cord member and said toy element are caused to shoot outward for engaging a cat in play, and said pull knob capable of being pulled back again by said user for repeated outward shooting events.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
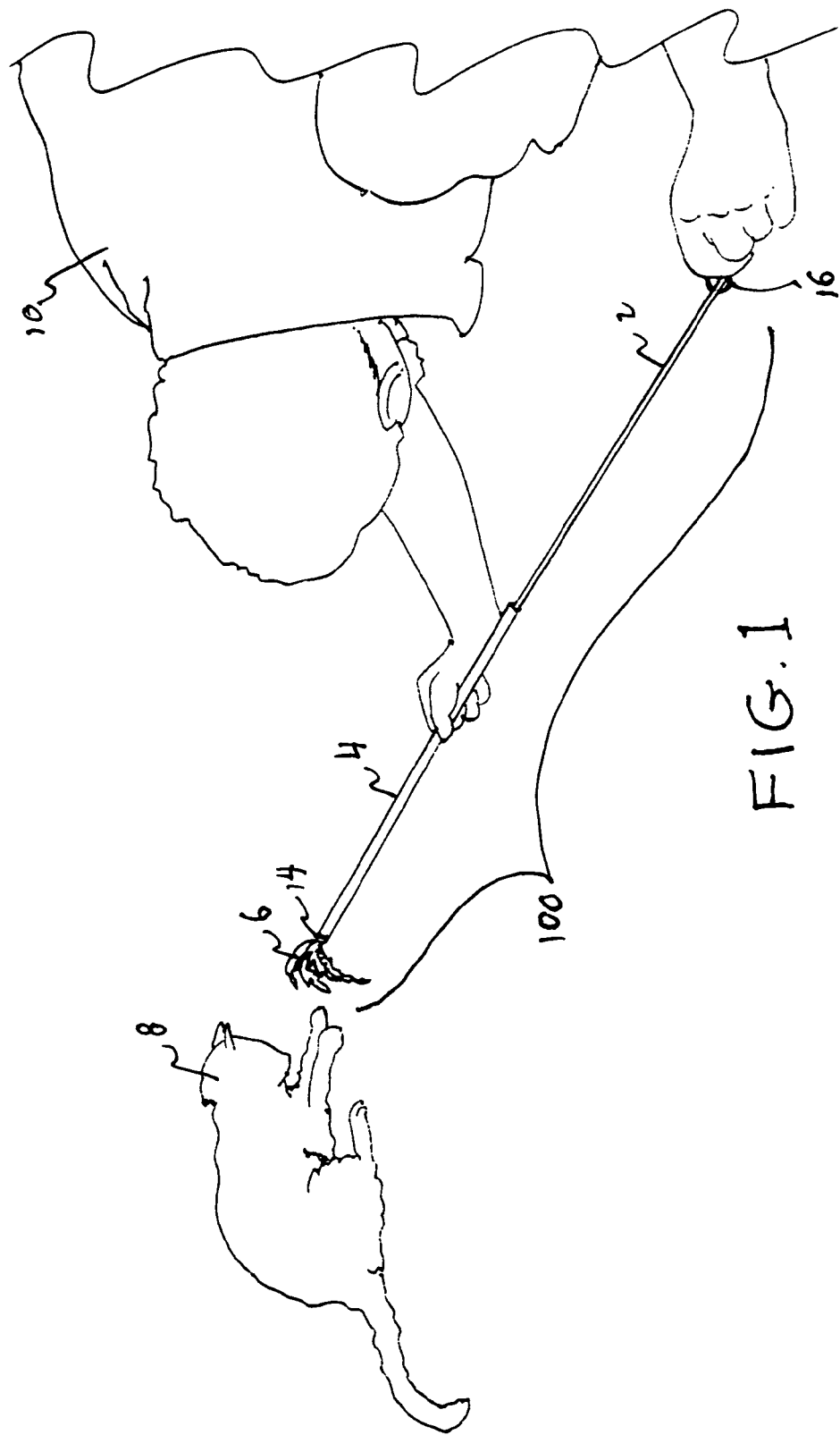
FIG. 1 is a perspective view a user getting ready to shoot the toy element out from the invention.

Referring now to FIG. 1 we see a perspective view of the cat toy of the present invention 100. This view shows the user 10 pulling back on pull knob 16. A rigid inner tube 2 is fixedly attached to the knob 16. An elastic cord located within the inner tube 2 and a rigid outer tube 4 is also connected to the pull knob 16 at one end and to a stop plate 14 and a toy element 6 at the opposite end. The elastic cord, otherwise known as a bungy cord, is approximately one eighth of an inch in diameter which makes it flexible enough to bend and wiggle but thick enough to allow the user to twist the cat toy 6 by twisting the pull knob 16. The user is holding onto the outer rigid tube 4 with one hand while pulling back on the pull knob 16 with the other hand. The elastic cord 12, hidden in this view, is located within both tubes 2, 4 and is fully stretched. When the user 10 lets go of the pull knob 16 the inner tube 2, which is slidably and telescopingly engaged with the outer tube 4, shoots forward due to the built up energy of elastic cord 12. The toy element 6 is thereby shot forward in a quick manner causing the cat 8 to want to go after the toy element 6. The user 10 can then draw the inner tube 2 and cord 16 and cat toy 6 back at a slow or a fast speed. While drawing the toy 6 back, the thickness and consistency of the elastic cord 12 allows the user to twist the toy 6 by twisting the pull knob 16. This twisting action further attracts the cat's 8 attention. The fact that the cord 12 is elastic means that as the cat pulls on the toy 6, a more realistic feeling of resistance is felt by the cat in comparison to a non-elastic cord. This feature increases the play value of the present invention. The user can then repeat the pulling and releasing action as many times as desired the length of the outer tube 4 is approximately twenty-six inches. The length of the inner tube 2 is approximately twenty-nine inches. The length of the elastic cord 12 in its non-stretched position is approximately forty-seven inches. These dimensions have been found to be ideal for the intended application. The entire invention 100 is simple and economical to construct and can therefore can be sold at a low cost to the cat owning consumer.

Figure 2:
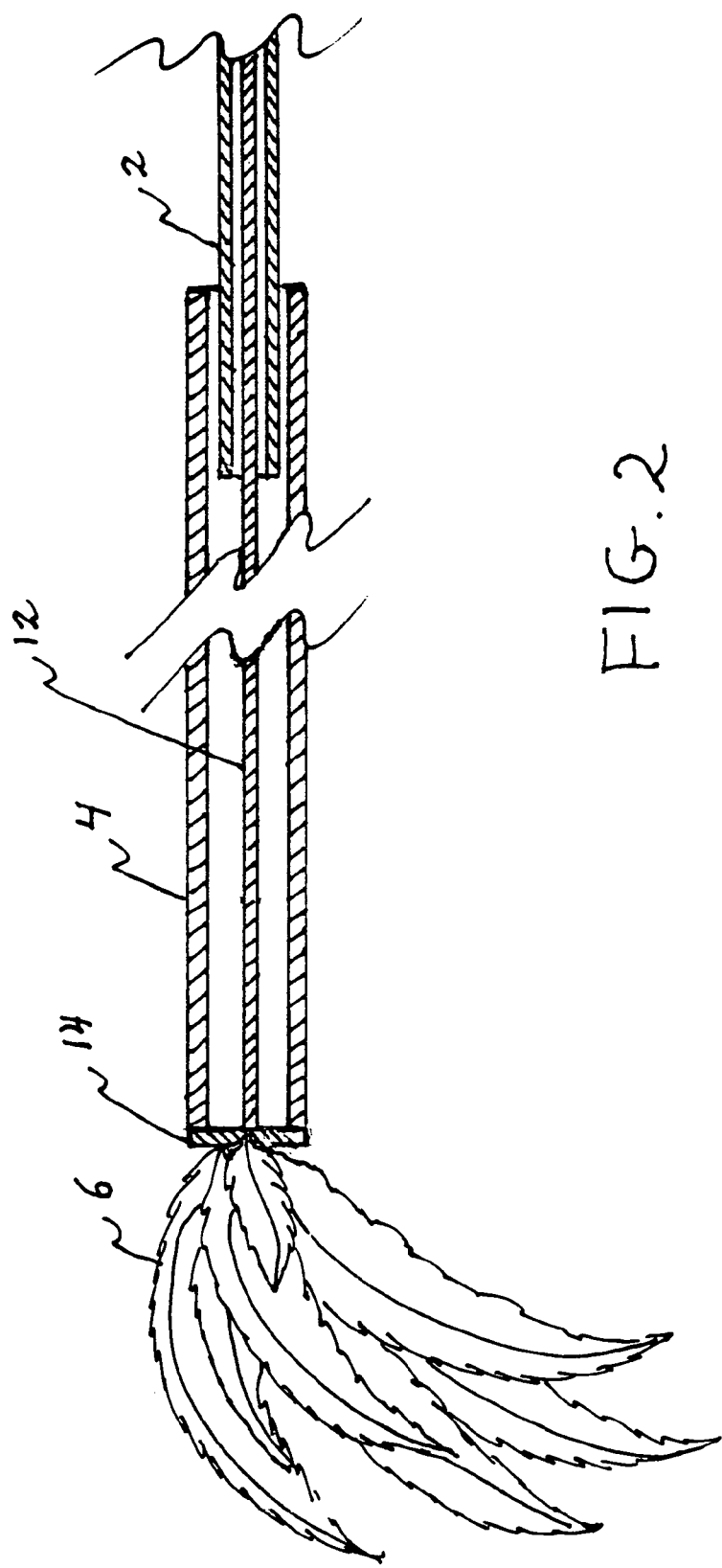
FIG. 2 is a partial side section view of the invention in the ready to shoot position.

FIG. 2 is a partial side section view of the invention which longitudinally bisects the inner tube 2 and outer tube 4. In this view the inner tube 2 has been pulled back in the ready to shoot mode. The stop plate 14 is drawn in by fixedly attached elastic cord 12 which also has drawn in cat toy element 6 which is also fixedly attached to the end of elastic cord 12.

Figure 3:
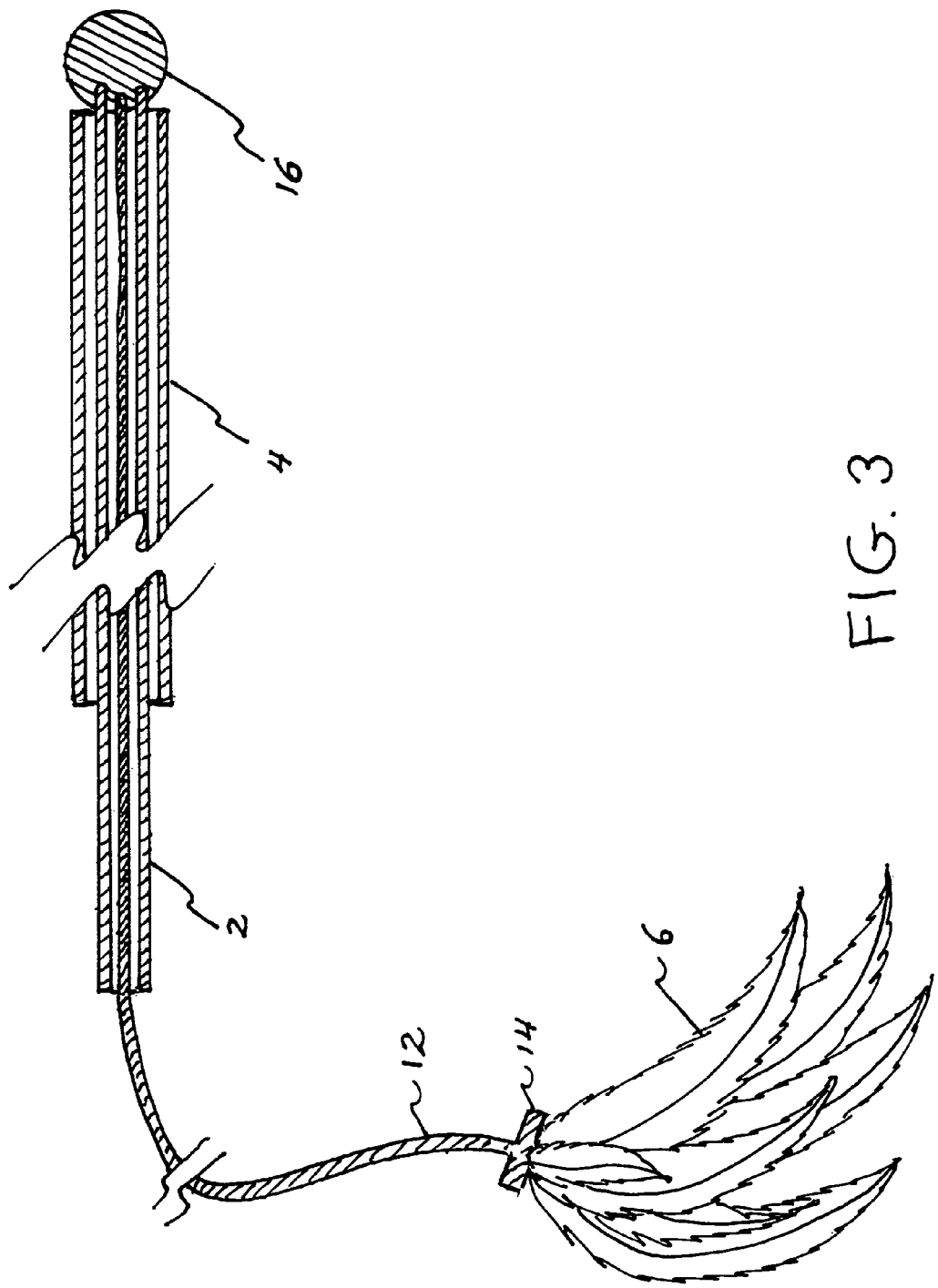
FIG. 3 is a partial side section view of the invention in the after the shoot position.

FIG. 3 is a partial side section view of the invention which longitudinally bisects the inner tube 2 and outer tube 4. In this view the pull knob 16 has been released by the user and the elastic cord 12 has shot out of inner tube 2. The extended cord 12 and toy element 6 can now be played with by a cat, and the user can now draw the elastic cord 12 and inner tube 2 back by pulling on pull knob 16. During the pull back process, the user can twist pull knob 16 causing the twisting action to be transferred to the cord 12 and finally to toy element 6. The twisting action further enhances the play value of the invention 100.

Figure 4:
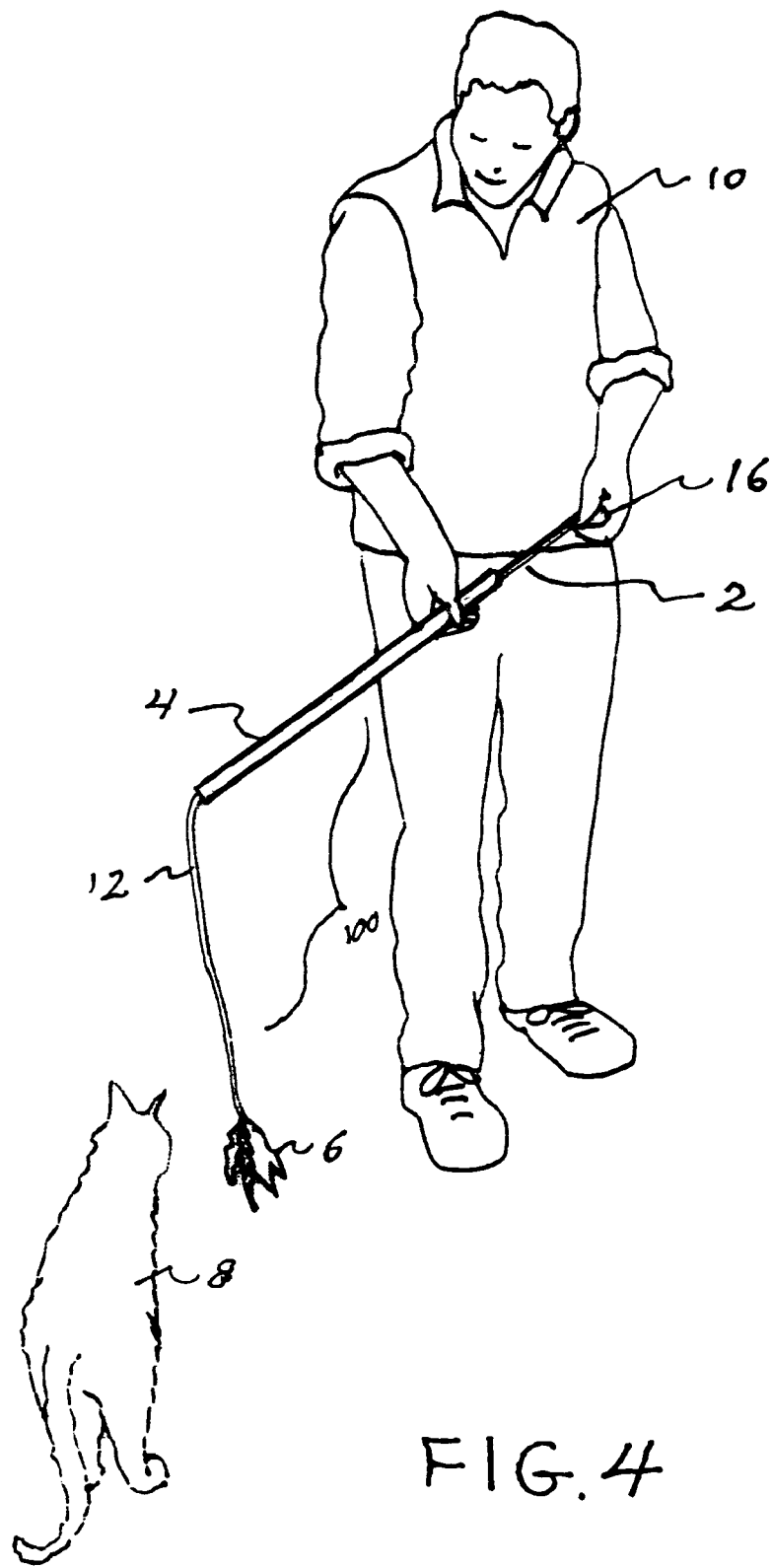
FIG. 4 is a perspective view of a user employing the twist and turn aspect of the invention.

FIG. 4 shows a perspective view of a person 10 holding the pull knob 16 while the elastic cord 12 is in the relaxed position. In this mode, the user can twist and pull or push on the pull knob 16 to impart life like movement in the toy element 6 causing the cat 8 to play with the toy 6 as it uses its natural hunting and capturing abilities.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. cat toy comprising:
   a rigid outer tube member;
   a rigid inner tube member;
   an elastic cord member;
   a stop plate;
   a pull knob;
   a toy element;
   said rigid inner tube member slidably and telescopingly engaged within said rigid outer tube member;
   said elastic cord member slidably engaged within said rigid inner tube member;
   said toy element and said stop plate fixedly attached to the distal end of said elastic cord member;
   said pull knob fixedly attached to one end of said rigid inner tube member and to one end of said elastic cord member;
   so that when a user pulls back on said pull knob, said elastic cord member is caused to stretch, causing said stop plate and said toy element to be drawn to intimate proximity to the distal end of said rigid outer tube member;
   so that when said pull knob is released by said user, said rigid inner tube member and said elastic cord member and said toy element are caused to shoot outward for engaging a cat in play; and
   said pull knob capable of being pulled back again by said user for repeated outward shooting events.

2. A cat toy as claimed in claim 1 wherein said user can twist and push or pull on said pull knob while said elastic cord is in an relaxed state and transmit said pushing and pulling and twisting action to said toy element thereby providing further play activity for said cat.

3. A cat toy as claimed in claim 1 wherein said outer tube is approximately twenty-six inches in length;
   said inner tube is approximately twenty-nine inches in length and
   said elastic cord is approximately forty-seven inches in length in its relaxed, non-stretched state.

* * * * *